(12) United States Patent
Paul (10) Patent No.: US 12,100,397 B1
(45) Date of Patent: *Sep. 24, 2024

(54) SYSTEMS AND METHODS FOR SCREENLESS COMPUTERIZED SOCIAL-MEDIA ACCESS

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,297

(22) Filed: Dec. 13, 2022

Related U.S. Application Data (63) Continuation of application No. 16/656,888, filed on Oct. 18, 2019, now Pat. No. 11,551,680.

(51) Int. Cl.
| | |
|---|---|
| *G10L 15/22* | (2006.01) |
| *G06Q 50/00* | (2012.01) |
| *G10L 13/02* | (2013.01) |
| *G10L 15/26* | (2006.01) |
| *H04L 51/52* | (2022.01) |

(52) U.S. Cl.
CPC ............ *G10L 15/22* (2013.01); *G06Q 50/01* (2013.01); *G10L 13/02* (2013.01); *G10L 15/26* (2013.01); *H04L 51/52* (2022.05); *G10L 2015/223* (2013.01)

(58) Field of Classification Search
None
See application file for complete search history.

(56) References Cited

U.S. PATENT DOCUMENTS

| | | | |
|---|---|---|---|
| 9,043,196 B1 * | 5/2015 | Leydon | G06F 40/289 |
| | | | 704/4 |
| 10,095,686 B2 | 10/2018 | Zhang et al. | |
| 10,339,452 B2 | 7/2019 | Romano et al. | |
| 10,380,613 B1 * | 8/2019 | Liu | G06Q 30/0202 |
| 10,684,738 B1 | 6/2020 | Sicora et al. | |
| 11,017,173 B1 * | 5/2021 | Lu | G06N 3/045 |
| 2012/0209605 A1 * | 8/2012 | Hurvitz | G06F 16/685 |
| | | | 704/235 |
| 2013/0165086 A1 | 6/2013 | Doulton | |
| 2013/0219277 A1 | 8/2013 | Wang et al. | |
| 2013/0289991 A1 | 10/2013 | Eshwar et al. | |
| 2014/0172427 A1 | 6/2014 | Liu et al. | |
| 2015/0220513 A1 * | 8/2015 | Lyman | G06F 40/42 |
| | | | 704/9 |

(Continued)

*Primary Examiner* — Neeraj Sharma
(74) *Attorney, Agent, or Firm* — Greenberg Traurig, LLP (57) ABSTRACT

Systems and methods for screenless computerized social-media access may include (1) producing, via an audio speaker that is communicatively coupled to a computing device, a computer-generated verbal description of a social-media post provided via a social-media application, (2) detecting, via a microphone that is communicatively coupled to the computing device, an audible response to the social-media post from a user of the computing device, and (3) digitally responding to the social-media post in accordance with the detected audible response. Various other methods, systems, and computer-readable media are also disclosed.

20 Claims, 6 Drawing Sheets

(56) References Cited

U.S. PATENT DOCUMENTS

| | | |
|---|---|---|
| 2016/0103875 A1* | 4/2016 | Zupancic ................ G06F 40/20 707/773 |
| 2016/0179967 A1* | 6/2016 | Sa ....................... G06F 16/3346 707/730 |
| 2016/0196351 A1 | 7/2016 | Bank et al. |
| 2016/0328482 A1 | 11/2016 | Shah et al. |
| 2017/0192624 A1* | 7/2017 | Wu ....................... G06F 40/274 |
| 2018/0060416 A1 | 3/2018 | Bastide et al. |
| 2018/0260385 A1* | 9/2018 | Fan ....................... G06F 40/274 |
| 2018/0268820 A1 | 9/2018 | Park et al. |
| 2019/0026293 A1 | 1/2019 | Shah et al. |
| 2019/0146636 A1* | 5/2019 | Kremer-Davidson ... G06N 7/01 706/11 |
| 2019/0318734 A1 | 10/2019 | Nair |
| 2020/0126174 A1 | 4/2020 | Halse et al. |
| 2020/0153760 A1* | 5/2020 | Pace ....................... H04L 51/10 |
| 2020/0410996 A1 | 12/2020 | Brandel et al. |

* cited by examiner

SYSTEMS AND METHODS FOR SCREENLESS COMPUTERIZED SOCIAL-MEDIA ACCESS

CROSS REFERENCE TO RELATED APPLICATION

This application is a continuation of U.S. application Ser. No. 16/656,888, filed 19 Oct. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Social-media platforms provide information that enables users to stay digitally connected in a way that would have never been possible prior to our digital age. This increase in connectivity, however, does not come without disadvantages. An inherent problem in the configuration of traditional computers is the need to convey information via a screen, whose use may be burdensome (e.g., creating irritations such as eyestrain) and/or incompatible with a user's daily activities (e.g., driving). Responding to this, the instant disclosure identifies a need for systems and methods that enable computers to facilitate digital social connection (e.g., by providing social-media information) without the use of a screen and/or with minimal screen use.

As will be described in greater detail below, embodiments of the present disclosure may provide an ambient social-media system that allows a user to engage with a social-media application without visually engaging with a screen. In some examples, the ambient social-media system may (1) designate one or more social-media posts as priority posts (e.g., based on a priority metric and/or user input), (2) provide a computer-generated vocalization describing the designated social-media posts, and (3) respond to a designated post based on audible user feedback to the computer-generated vocalization.

In one embodiment, the audible user feedback may represent a spontaneous reply, such as laughter. In this embodiment, the ambient social-media system may respond and/or offer to respond to the designated post based on the spontaneous reply. In some examples, the audible user feedback may represent a vocal command and the ambient social-media system may respond as instructed by the vocal command. As a specific example, the audible user feedback may include a vocal command to bookmark the designated post and the ambient social-media system may, in response to receiving the vocal command, bookmark the designated post (e.g., by placing the designated post in a designated area within a social-media interface and/or visually highlighting the designated post within the social-media interface).

As will be explained in greater detail below, embodiments of the present disclosure may enable the screenless delivery of social media content. This may improve the functioning of a computer itself by enabling the computer to provide digital content and receive user instructions without the limitations that reliance on a screen imposes.

Figure 1:
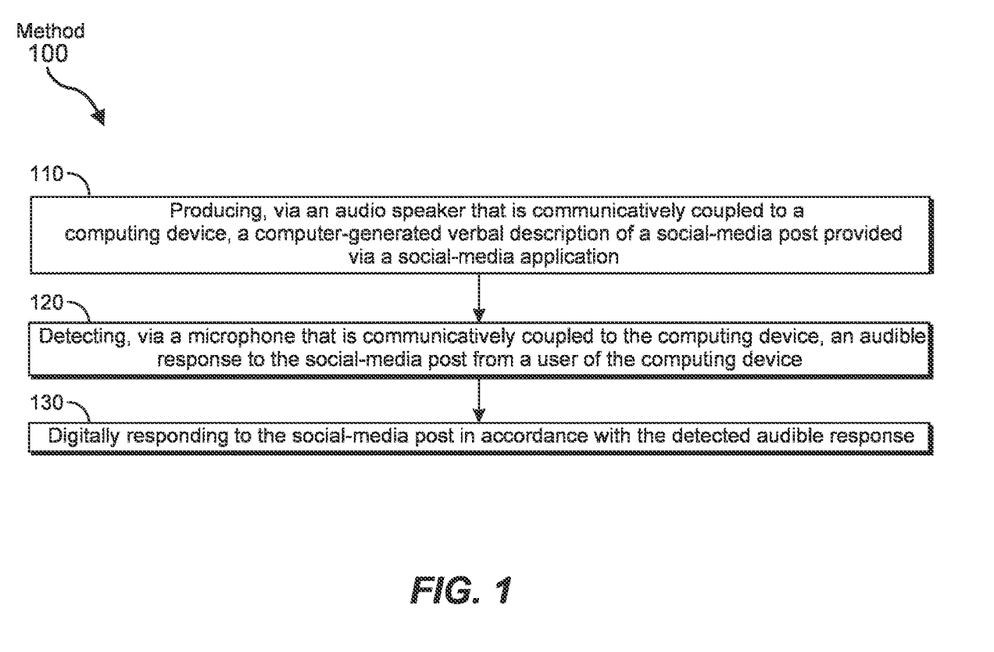
FIG. 1 is a flow diagram of an exemplary method for providing screenless computerized social-media access.

The following will provide, with reference to FIG. 1, detailed descriptions of computer-implemented methods for providing screenless computerized social-media access. Detailed descriptions of corresponding example systems will also be provided in connection with FIG. 2. Additionally, detailed descriptions of exemplary social-media interfaces will be provided in connection with FIGS. 3-4. Finally, detailed descriptions of an exemplary screenless social-media environment will be provided in connection with FIGS. 5A-5B.

FIG. 1 is a flow diagram of an exemplary computer-implemented method 100 for providing screenless computerized social-media access. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that may perform one or more functions directed at providing a screenless computerized social-media system. The term "screenless computerized social-media system" may refer to any type or form of digital social-media system in which one or more functionalities are provided to a user, and/or one or more instructions are received by the user, without the use of a screen (e.g., via a speaker and/or a microphone). In some examples, server 202 may operate in connection with a social-media platform 206. Although illustrated as a single entity in FIG. 2, server 202 may include and/or represent a group of multiple servers that operate in conjunction with one another.

Figure 2:
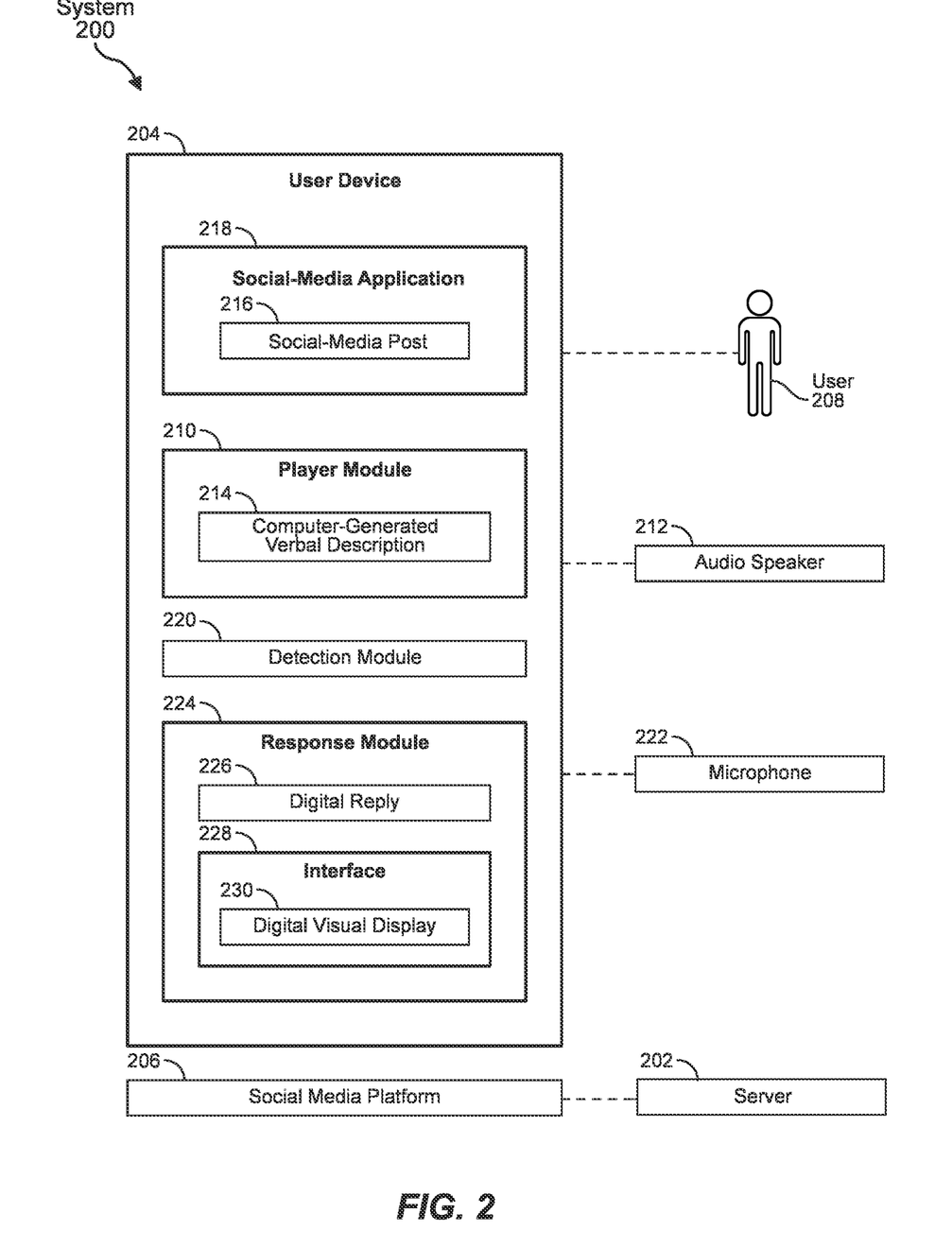
FIG. 2 is a block diagram of an exemplary system for providing screenless computerized social-media access.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a member of social-media platform 206. In these examples, user device 204 may have installed an instance of a social-media application, which may operate as part of social-media platform 206 and through which one or more services provided by server 202 may be accessible. Additionally or alternatively, user device 204 may have installed a browser that may navigate to one or more webpages maintained by social-media platform 206, through which one or more services provided by server 202 may also be accessible.

Social-media platform 206 may provide a variety of services for the users within its network (e.g., user 208). In one example, social-media platform 206 may provide a newsfeed service. The term "newsfeed" may generally refer to any type or form of social-media consumption channel that presents a scrollable collection of newsfeed posts. In some examples, a newsfeed may scroll (e.g., upward or downward) to reveal different posts within the newsfeed, in response to receiving user scrolling input. In one example, the scrollable collection may include a collection of newsfeed posts created by contacts of a particular user (e.g., friends of the particular user). The term "newsfeed post" as used herein generally refers to any type or form of digital composition that may be displayed in a newsfeed. Newsfeed posts may include, without limitation, text-based compositions, media-based compositions (which may include either a single media item or a collage of multiple media items), and/or a link to an online article.

As another example, social-media platform 206 may provide a digital story service. The digital story service may provide users with a story consumption channel, which presents a continuous series of digital story posts to a story-consumer, one by one. In one example, the story consumption channel may transition from presenting one digital story post to the next automatically, without requiring any user input to do so. In some examples, a digital story post may only be viewable for a predetermined amount of time. For example, a digital story composition may be set to disappear after twenty-four hours. The term "digital story post" may generally refer to any type or form of social-media post intended for a story consumption channel. A digital story composition may include a variety of content (e.g., a digital photograph, a graphic, text, a digital video and/or a digital recording of a music composition). In some examples, digital story posts from a same source (e.g., created and/or posted by a same user) may be grouped together within the story consumption channel, such that each digital story post from a particular source is displayed prior to displaying digital story posts from another source.

As another example, social-media platform 206 may provide a messaging service. The term "messaging service" may generally refer to any type or form of digital message delivery system that enables users of social-media platform 206 to exchange messages (e.g., private messages between two or more users). These messages may include a variety of content (e.g., a text, link, live video, voice recordings, etc.) and may take a variety of forms (e.g., e-mail, text message, group chat, etc.).

Returning to FIG. 1, at step 110, one or more of the systems described herein may produce, via an audio speaker that is communicatively coupled to a computing device, a computer-generated verbal description of a social-media post provided via asocial-media application. For example, as illustrated in FIG. 2, a player module 210 may produce, via an audio speaker 212 that is communicatively coupled to user device 204, a computer-generated verbal description 214 of a social-media post 216 provided via a social-media application 218.

Social-media application 218 may generally refer to any type or form of computer program (e.g., provided via an application module) that provides functions relating to digital social networking. In some examples, social-media application 218 may operate in conjunction with server 202 as part of social-media platform 206 and may enable digital access to social-media posts hosted by server 202. Social-media application 218 may enable digital access to social-media posts in a variety of ways. For example, social-media application 218 may provide access to an interface that visually displays social-media posts via a display element of user device 204.

Figure 3:
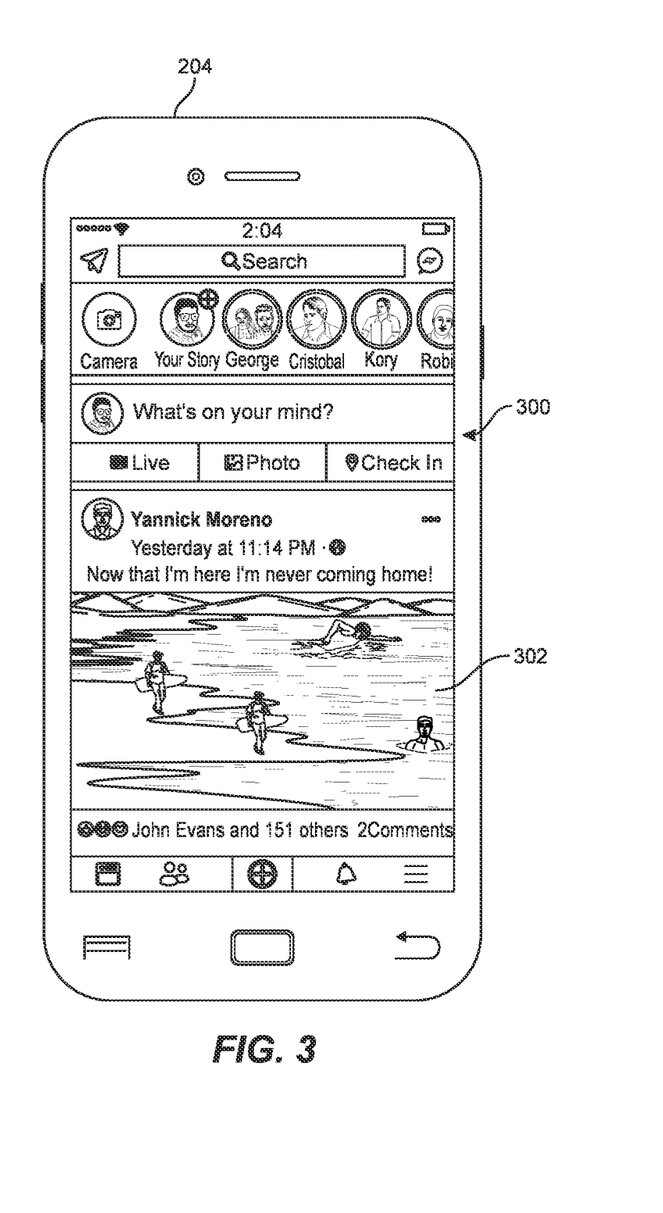
FIG. 3 is an illustration of an exemplary newsfeed interface.
Figure 4:
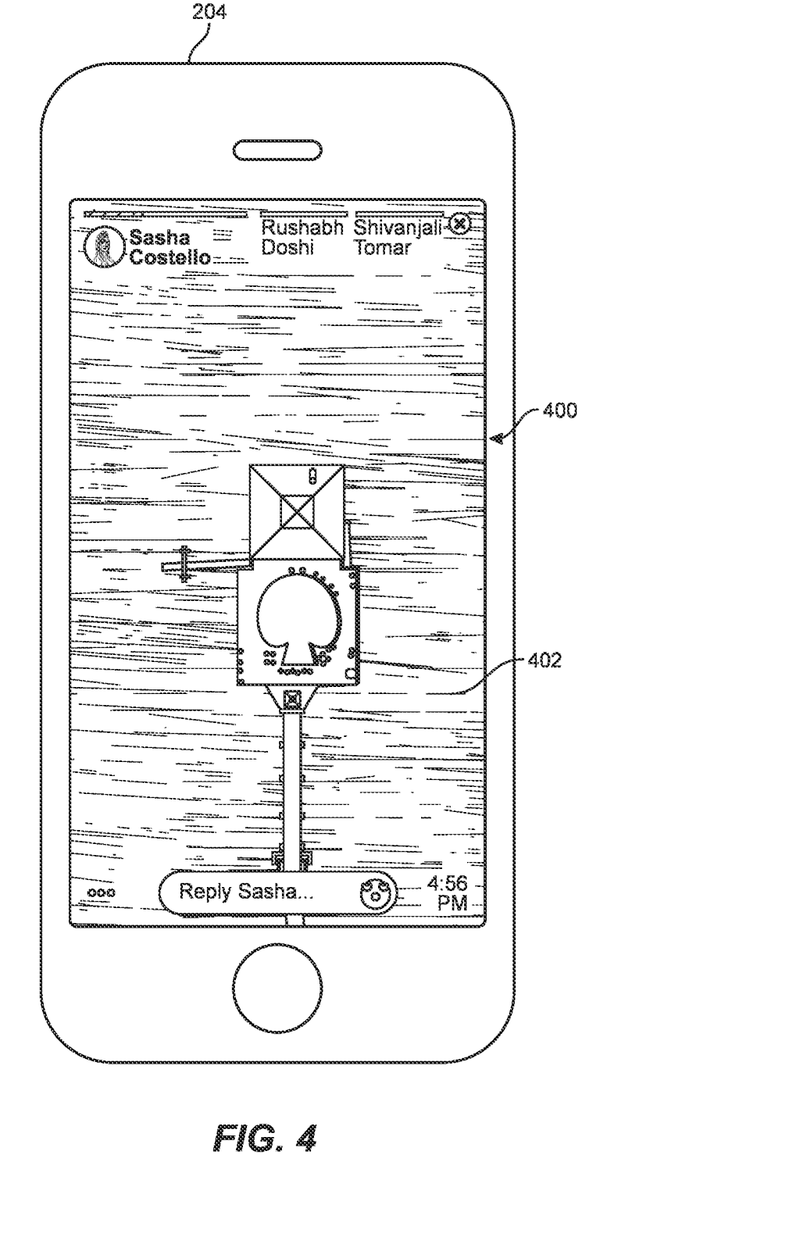
FIG. 4 is an illustration of an exemplary digital story interface.

FIG. 3 provides a specific example of a digital newsfeed interface 300, with social-media posts such as newsfeed composition 302, which social-media application 218 may provide. FIG. 4 provides a specific example of a digital story interface 400 with social-media posts, such as digital story composition 402, which social-media application 218 may provide. Additionally or alternatively, as will be described in greater detail below, social-media application 218 may provide social-media content auditorily via an auditory device such as a speaker.

Computer-generated verbal description 214 may generally represent any type or form of artificial auditory production (i.e., synthesized speech) that verbally describes a social-media post. Computer-generated verbal description 214 may describe social-media post 216 in a variety of ways. In some examples, computer-generated verbal description 214 may include a synthesized reading of written text included within social-media post 216 and/or a summary of the written text. Additionally or alternatively, computer-generated verbal description 214 may include a synthesized verbal description of an image included within social-media post 216. In some examples, computer-generated verbal description 214 may further describe one or more digital responses posted to social-media post 216.

Figure 5A:
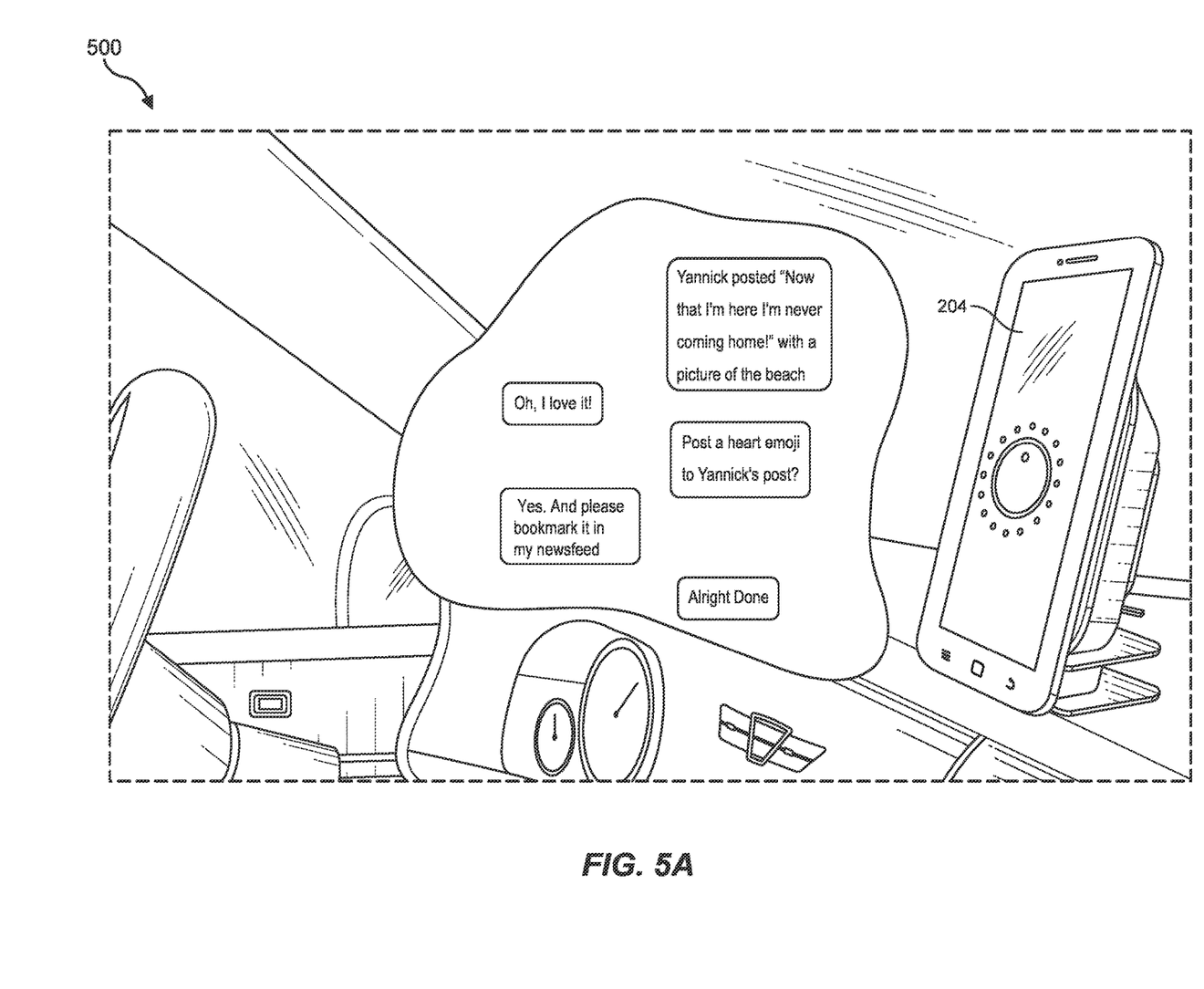
FIGS. 5A-5B are a depiction of an exemplary screenless social-media environment.
Figure 5B:
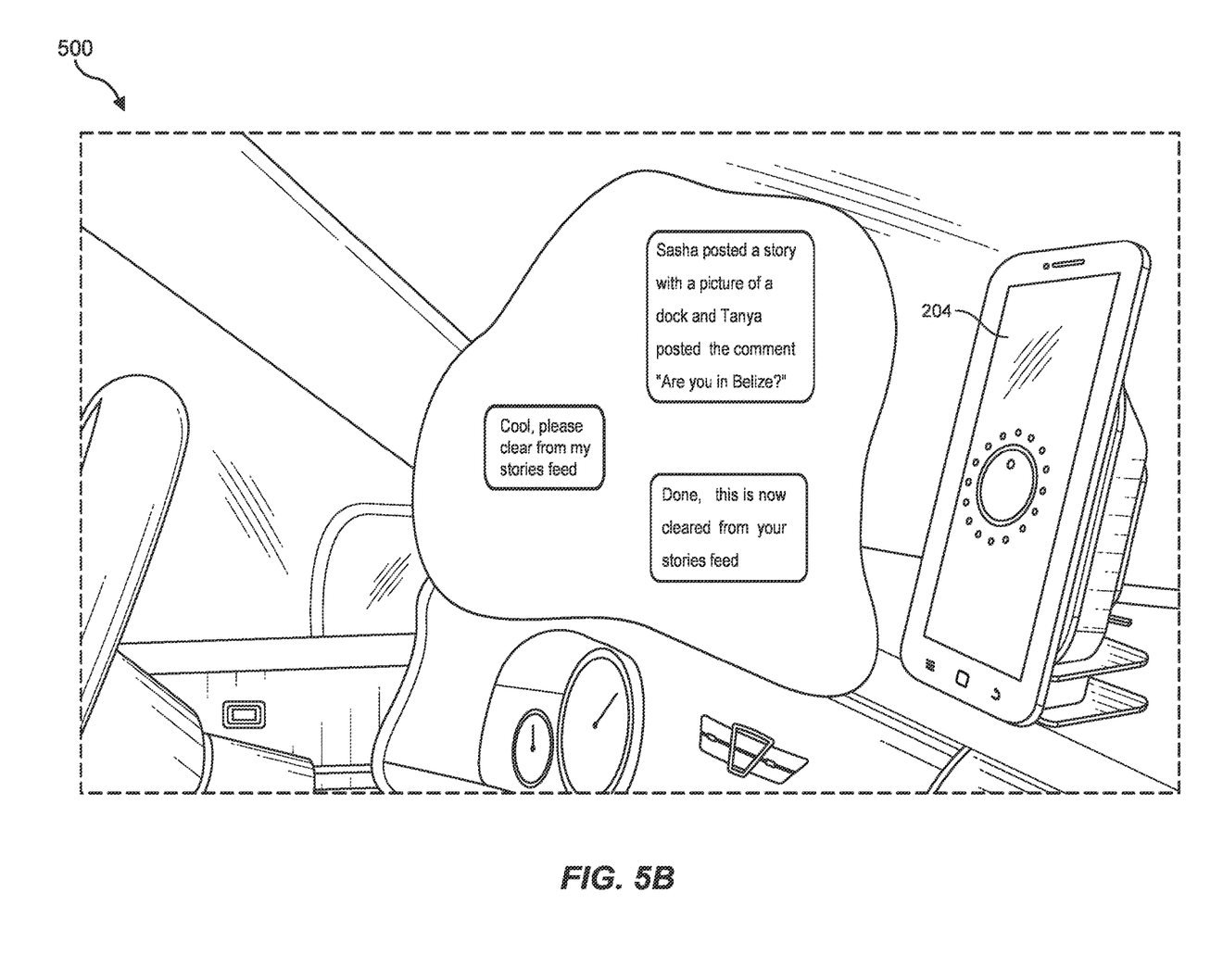

FIGS. 5A-5B provide a specific example of a screenless social-media environment 500 in which player module 210 produces (1) a synthesized reading of text and verbal summary of an image from newsfeed composition 302 depicted in FIG. 3 (i.e., by playing a synthesized vocalization of the phrase "Yannick posted 'Now that I'm here I'm never coming home!' with a picture of the beach"), shown in FIG. 5A, and (2) a synthesized verbal summary of an image within digital story composition 402 depicted in FIG. 4 along with an additional user's response to digital story composition 402 (i.e., by playing a synthesized vocalization of the phrase "Sasha posted a story with a picture of a dock and Tanya posted the comment 'Are you in Belize?!'"), shown in FIG. 5B.

Prior to player module 210 producing (e.g., playing) computer-generated verbal description 214, a speech synthesis module may create computer-generated verbal description 214. The speech synthesis module may create computer-generated verbal description 214 using any type or form of text-to-speech system. In some examples, the speech synthesis module may include or represent a text-to-speech tool that converts written text to a phonemic representation of the text (e.g., relying on a neural network to resolve potential pronunciation ambiguities) and then converts the phonemic representations to waveforms that may be output (e.g., via audio speaker 212) as sound. Additionally, the speech synthesis module may include an image-recognition tool to identify content within an image of social-media post 216, which may then be described as part of computer-generated verbal description 214.

Audio speaker 212 may represent any type or form of output hardware device that converts electrical signals into sounds. In some examples, audio speaker 212 may be embedded directly within user device 204. In other examples, audio speaker 212 may represent an external device and/or may be embedded within an external device that is communicatively coupled to user device 204. In these examples, audio speaker 212 may be communicatively coupled via a wireless connection (e.g., via Bluetooth) and/or a wired connection (e.g., via a cable). FIGS. 5A-5B illustrate a specific example in which audio speaker 212 represents a car speaker communicatively coupled to user device 204. In other examples in which audio speaker 212 operates as part of an external device, audio speaker 212 may represent a smart speaker and/or a set of headphones.

Player module 210 may produce computer-generated verbal description 214 in response to a variety of triggers. In some examples, player module 210 may produce computer-generated verbal description 214 in response to determining that social-media post 216 satisfies a priority threshold. In some such examples, player module 210 may rely on the same priority threshold used to prioritize social-media posts within a visual display of the social-media posts (e.g., within a newsfeed interface and/or a digital story interface). In these examples, player module 210 may be configured to produce a computer-generated verbal description of a predetermined number of social-media posts from the visual display (e.g., the first three posts to be displayed within a newsfeed interface and/or a digital story interface).

The priority threshold relied on by player module 210 may be based on a variety of metrics (e.g., an author of a social-media post, content of the social-media post, a number of views and/or digital responses posted to the social-media post, a metric relating to user 208, etc.). In one embodiment, the priority threshold may be based on an urgency metric. In this embodiment, social-media posts with characteristics indicative of urgency may be prioritized. As a specific example, a social-media post with a deadline (e.g., "Does anyone want to come over for dinner and a movie tonight at six?") may be prioritized.

In some examples, player module 210 may produce computer-generated verbal description 214 in response to detecting a predetermined contextual trigger. For example, player module 210 may be configured to produce computer-generated verbal description 214 at a predetermined time (e.g., every day at 7 AM). As another example, player module 210 may be configured to produce computer-generated verbal description 214 in response to determining that user device 204 is at a particular location and/or that user 208 is engaged in a particular activity (e.g., driving home from work). In one embodiment, player module 210 may produce computer-generated verbal description 214 as part of producing a daily social-media recap.

In some embodiments, player module 210 may produce computer-generated verbal description 214 in response to receiving user input requesting computer-generated verbal description 214. In these embodiments, player module 210 may receive the user input in a variety of ways. For example, player module 210 may receive tactile input submitted to a touchscreen and/or an auxiliary device such as a computer mouse. Additionally or alternatively, player module 210 may receive audio input (e.g., a vocal command) received via a microphone communicatively coupled to user device 204. In some examples, the user input may specifically request a verbal description of social-media post 216. In other examples, the user input may request a verbal description of a specific category of social-media posts. For example, the user input may request a daily social-media recap and/or a description of social-media posts posted by a particular user and/or a designated category of user, such as user 208's family members.

Returning to FIG. 1, at step 120, after producing the computer-generated verbal description, one or more of the systems described herein may detect, via a microphone that is communicatively coupled to the computing device, an audible response to the social-media post from a user of the computing device. For example, a detection module 220 may detect, via a microphone 222 that is communicatively coupled to user device 204, an audible response, produced by user 208, to social-media post 216. In some examples, microphone 222 may be embedded within user device 204 directly. In other examples, microphone 222 may represent and/or be included within an external device that is communicatively coupled to user device 204 via a wired and/or wireless connection.

Detection module 220 may detect a variety of audible responses. In some examples, detection module 220 may detect a spontaneous audible response. As a specific example, detection module 220 may detect laughter. Other examples of spontaneous responses may include, without limitation, an exclamation, a grunt, and/or a muttering. Using FIG. 5A as a specific example, detection module 220 may detect the spontaneous exclamation "Oh, I love it!"

In additional or alternative embodiments, detection module 220 may detect a vocal command. The vocal command may include, without limitation, an instruction to clear social-media post 216 from an interface 228 that displays social-media posts for user 208 (e.g., a newsfeed and/or digital story interface) and/or an instruction to post a digital response to social-media post 216 within a social-media interface such as interface 228. In one embodiment, the vocal command may include an instruction to bookmark social-media post 216. In this embodiment, the bookmark instruction may represent an instruction to place a visual depiction of social-media post 216 in a designated area within interface 228 (e.g., as the top post within interface 228) for later access.

In some examples, the vocal command may represent an established (i.e., pre-programmed) command. In other examples, detection module 220 may (1) detect a vocal utterance and (2) determine, using machine learning, (i) that the vocal utterance is a command and (ii) a substance of the command. Using FIG. 5B as a specific example, detection module 220 may identify a "clear" command in response to detecting the phrase "Cool. Please clear from my stories feed."

Finally, returning to FIG. 1, at step 130, one or more of the systems described herein may digitally respond to the social-media post in accordance with the detected audible response. For example, as shown in FIG. 2, a response module 224 may digitally respond to social-media post 216 in accordance with the detected audible response detected from user 208 via microphone 222.

Response module 224 may digitally respond to social-media post 216 in a variety of ways (e.g., depending on the type of audible response detected from user 208). In examples in which the audible response represents a spontaneous verbal response, response module 224 may (1) create a digital reply 226 to social-media post 216 that is based on the spontaneous verbal response and (2) post digital reply 226 to social-media post 216 (e.g., within an interface that displays social-media posts such as interface 228, digital newsfeed interface 300, and/or digital story interface 400). As a specific example, in examples in which the audible response represents laughter, response module 224 may (1) create a digital reply that includes the text "hahaha" and/or an emoji of a laughing face and (2) post the digital reply to an interface that displays social-media posts by including the text in a comments section corresponding to social-media post 216 and/or affixing the emoji to an emojis section of social-media post 216.

Response module 224 may create a digital reply 226 based on a spontaneous verbal response in a variety of ways. In some examples, response module 224 may rely on a policy that delineates replies to be selected for various specified verbal responses (e.g., a policy to select the digital reply "hahaha" in response to detecting laughter). In other examples, response module 224 may rely on a machine learning classifier to create digital reply 226. In these examples, the machine learning classifier may have been trained on a variety of training data (e.g., data indicating (1) spontaneous audible responses detected from users and (2) subsequent digital replies selected and/or approved by those users afterward).

In some examples, response module 224 may automatically post digital reply 226 in response to detecting an audible response from user 208. In other examples, response module 224 may provide user 208 with a suggestion to post digital reply 226 (e.g., a computer-generated verbalization of the suggestion produced via audio speaker 212) and may post digital reply 226 in response to receiving an affirmative user acceptance (e.g., a verbal acceptance received via microphone 222). Using FIG. 5A as a specific example, response module 224 may provide the computer-generated verbalization "Post a heart emoji to Yannick's post?" via audio speaker 212 and may receive the verbal response "Yes" via microphone 222.

In examples in which the audible response represents an established vocal command, response module 224 may digitally respond to social-media post 216 as directed by the established vocal command. For example, response module 224 may clear social-media post 216 from interface 228 in response to receiving a clear instruction (e.g., the instruction "please clear from my stories feed" depicted in FIG. 5B). As another example, response module 224 may post a reply indicated by an established vocal command (e.g., may post the reply "Nice Job" to a comments section corresponding to social-media post 216 in response to receiving the audible instruction "Reply 'Nice Job'").

In examples in which the audible response represents an instruction to bookmark social-media post 216, response module 224 may bookmark social-media post 216 within interface 228 by (1) providing a digital visual display 230 of social-media post 216 within interface 228 and (2) visually designating digital visual display 230 as bookmarked within interface 228. In these examples, response module 224 may visually designate digital visual display 230 as bookmarked within interface 228 in a variety of ways.

For example, response module 224 may place digital visual display 230 in a designated area within interface 228, highlight digital visual display 230 within interface 228 (e.g., with a colored overlay), and/or place a digital visual designator (e.g., a text-based designator and/or a graphic) adjacent to digital visual display 230 within interface 228. FIG. 3 provides an illustration of a specific embodiment of a digital newsfeed interface (300) in which an exemplary embodiment of social-media post 216 (corresponding to the post described in FIG. 5A) has been placed within a designated area (i.e., as the top post within the interface).

As described throughout the present disclosure, the disclosed systems and methods may provide systems and methods for screenless computerized social-media access. In one example, a computer-implemented method may include (1) producing, via an audio speaker that is communicatively coupled to a computing device, a computer-generated verbal description of a social-media post provided via a social-media application, (2) detecting, via a microphone that is communicatively coupled to the computing device, an audible response to the social-media post from a user of the computing device, and (3) digitally responding to the social-media post in accordance with the detected audible response.

In one embodiment, the method may further include determining that the social-media post satisfies a priority threshold. In this embodiment, producing the computer-generated verbal description of the social-media post may include producing the computer-generated verbal description of the social-media post in response to determining that the social-media post satisfies the priority threshold.

In some examples, the computer-generated verbal description of the social-media post may be produced in response to receiving a vocal command via the microphone. Additionally or alternatively, the computer-generated verbal description of the social-media post may be automatically produced in response to detecting a predetermined contextual trigger, such as a time, location, and/or activity. In one embodiment, detecting the audible response may include detecting a spontaneous response (e.g., laughter) to the social-media post. In this embodiment, digitally responding to the social-media post may include both (1) creating a digital reply to the social-media post based on the detected spontaneous response and (2) posting the digital reply to the social-media post.

In another embodiment, the audible response may include a vocal command and digitally responding to the social-media post may include responding as directed by the vocal command. In one such embodiment, the vocal command may include an instruction to bookmark the social-media post and digitally responding to the social-media post may include (1) providing a digital visual display of the social-media post within an interface that displays social-media posts from the social-media application and (2) visually designating the digital visual display of the social-media post as bookmarked within the interface (e.g., by placing the digital visual display of the social-media post in a designated area within the interface, highlighting the digital visual display of the social-media post within the interface, and/or placing a digital visual designator adjacent to the digital visual display of the social-media post within the interface).

In one embodiment, a system for implementing the above-described method may include (1) a player module, stored in memory, that produces, via an audio speaker that is communicatively coupled to a computing device, a computer-generated verbal description of a social-media post provided via a social-media application, (2) a detection module, stored in memory, that detects, via a microphone that is communicatively coupled to the computing device, an audible response to the social-media post from a user of the computing device, (3) a response module, stored in memory, that digitally responds to the social-media post in accordance with the detected audible response, and (4) at least one physical processor configured to execute the player module, the detection module, and the response module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) produce, via an audio speaker that is communicatively coupled to the computing device, a computer-generated verbal description of a social-media post provided via a social-media application, (2) detect, via a microphone that is communicatively coupled to the computing device, an audible response to the social-media post from a user of the computing device, and (3) digitally respond to the social-media post in accordance with the detected audible response.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   producing, via an audio speaker that is communicatively coupled to a computing device, a computer-generated verbal description of a social-media post provided via a social-media application;
   detecting, via a microphone that is communicatively coupled to the computing device, a spontaneous response to the social-media post;
   creating an emoji-based digital reply to the social-media post based on the spontaneous response; and
   affixing the emoji-based digital reply to an emojis section corresponding to the social-media post.

2. The computer-implemented method of claim 1, wherein:
   the method further comprises determining that the social-media post satisfies a priority threshold; and
   producing the computer-generated verbal description of the social-media post comprises producing the computer-generated verbal description of the social-media post in response to determining that the social-media post satisfies the priority threshold.

3. The computer-implemented method of claim 1, wherein producing the computer-generated verbal description of the social-media post comprises producing the computer-generated verbal description of the social-media post in response to receiving a vocal command via the microphone.

4. The computer-implemented method of claim 1, wherein producing the computer-generated verbal description of the social-media post comprises automatically producing the computer-generated verbal description of the social-media post in response to detecting a predetermined contextual trigger.

5. The computer-implemented method of claim 4, wherein the predetermined contextual trigger comprises at least one of:
- a time;
- a location; or
- an activity.

6. The computer-implemented method of claim 1, wherein the spontaneous response comprises laughter.

7. The computer-implemented method of claim 6, wherein the emoji-based digital reply comprises an emoji of a laughing face.

8. The computer-implemented method of claim 1, further comprising posting the emoji-based digital reply in a comments section corresponding to the social-media post.

9. The computer-implemented method of claim 1, further comprising:
- creating a text-based digital reply to the social-media post based on the spontaneous response; and
- posting the text-based digital reply in a comments section corresponding to the social-media post.

10. The computer-implemented method of claim 1, wherein the spontaneous response comprises at least one of an exclamation, a grunt, or a muttering.

11. A system comprising:
- a player module, stored in memory, that produces, via an audio speaker that is communicatively coupled to a computing device, a computer-generated verbal description of a social-media post provided via a social-media application;
- a detection module, stored in memory, that detects, via a microphone that is communicatively coupled to the computing device, a spontaneous response to the social-media post;
- a response module, stored in memory, that:
  - creates an emoji-based digital reply to the social-media post based on the spontaneous response; and
  - affixes the emoji-based digital reply to an emojis section corresponding to the social-media post; and
- at least one physical processor configured to execute the player module, the detection module, and the response module.

12. The system of claim 11, wherein:
- the player module further determines that the social-media post satisfies a priority threshold; and
- the player module produces the computer-generated verbal description of the social-media post in response to determining that the social-media post satisfies the priority threshold.

13. The system of claim 11, the player module produces the computer-generated verbal description of the social-media post in response to receiving a vocal command via the microphone.

14. The system of claim 11, wherein the player module automatically produces the computer-generated verbal description of the social-media post in response to detecting a predetermined contextual trigger.

15. The system of claim 14, wherein the predetermined contextual trigger comprises at least one of:
- a time;
- a location; or
- an activity.

16. The system of claim 11, wherein the spontaneous response comprises laughter.

17. The system of claim 16, wherein the emoji-based digital reply comprises an emoji of a laughing face.

18. The system of claim 11, wherein the response module further posts the emoji-based digital reply in a comments section corresponding to the social-media post.

19. The system of claim 11, wherein the spontaneous response comprises at least one of an exclamation, a grunt, or a muttering.

20. A non-transitory computer-readable medium comprising one or more computer-readable instructions that, when executed by at least one processor of a computing device, cause the computing device to:
- produce, via an audio speaker that is communicatively coupled to a computing device, a computer-generated verbal description of a social-media post provided via a social-media application;
- detect, via a microphone that is communicatively coupled to the computing device, a spontaneous response to the social-media post;
- create an emoji-based digital reply to the social-media post based on the spontaneous response; and
- affix the emoji-based digital reply to an emojis section corresponding to the social-media post.

* * * * *